US012567731B2

(12) United States Patent
Kang et al.

(10) Patent No.: US 12,567,731 B2
(45) Date of Patent: Mar. 3, 2026

(54) POWER DEVICE PROTECTION APPARATUS

(71) Applicant: LS ELECTRIC CO., LTD., Anyang-si (KR)

(72) Inventors: Sunghee Kang, Anyang-si (KR);
Jungwook Sim, Anyang-si (KR);
Woonghyeob Song, Anyang-si (KR);
Dongjin Yun, Anyang-si (KR);
Chaeyoon Bae, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 244 days.

(21) Appl. No.: 18/285,922

(22) PCT Filed: Apr. 1, 2022

(86) PCT No.: PCT/KR2022/004730
§ 371 (c)(1),
(2) Date: Oct. 6, 2023

(87) PCT Pub. No.: WO2022/225223
PCT Pub. Date: Oct. 27, 2022

(65) Prior Publication Data
US 2024/0120727 A1 Apr. 11, 2024

(30) Foreign Application Priority Data

Apr. 22, 2021 (KR) ........................ 10-2021-0052563

(51) Int. Cl.
*H02H 3/08* (2006.01)
*H02H 5/04* (2006.01)
(52) U.S. Cl.
CPC ............ *H02H 3/085* (2013.01); *H02H 5/041* (2013.01)

(58) Field of Classification Search
CPC ........ H02H 3/085; H02H 5/041; H02H 7/205; H02H 3/006; H02H 5/044; H03K 17/0822; H03K 2217/0027; H03K 17/145
See application file for complete search history.

(56) References Cited

U.S. PATENT DOCUMENTS 7,310,048 B2 * 12/2007 Balakrishnan ............ H02J 7/02
340/545.4
8,027,132 B2 * 9/2011 Omaru ................ H02H 7/1225
361/93.1

(Continued)

FOREIGN PATENT DOCUMENTS

| CN | 112636304 A | * | 4/2021 | .......... H02H 1/0007 |
| JP | 2014096891 A | | 5/2014 | |

(Continued)

OTHER PUBLICATIONS

International Search Report for related International Application No. PCT/KR2022/004730; action dated Oct. 27, 2022; (2 pages).

(Continued)

*Primary Examiner* — Crystal L Hammond
*Assistant Examiner* — Samantha L Faubert
(74) *Attorney, Agent, or Firm* — K&L Gates LLP

(57) ABSTRACT

The present disclosure relates to a power device protection apparatus. A power device protection apparatus according to an embodiment of the present invention comprises: a comparator which is connected to a power device, and determines whether an overcurrent of the power device occurs; and a control unit which controls the comparator so as to change, by software, a overcurrent reference value for determining whether the overcurrent occurs, wherein the control unit receives temperature information of the power device, changes the overcurrent reference value on the basis of the temperature information, and performs the overcur- (Continued)

rent reference value change according to the temperature information, on the basis of the characteristics of the power device.

18 Claims, 9 Drawing Sheets

(56)                References Cited

U.S. PATENT DOCUMENTS

| | | | |
|---|---|---|---|
| 2015/0309090 A1 | 10/2015 | Akahane | |
| 2016/0043713 A1* | 2/2016 | Okuda | H03K 17/0826 |
| | | | 327/432 |
| 2018/0097515 A1* | 4/2018 | Norling | H03K 17/0828 |
| 2018/0335455 A1* | 11/2018 | Xiang | G01R 31/2801 |
| 2021/0283987 A1* | 9/2021 | Dangelmaier | B60H 1/2225 |

FOREIGN PATENT DOCUMENTS

| | | |
|---|---|---|
| JP | 2016039384 A | 3/2016 |
| JP | 2019122107 A | 7/2019 |
| JP | 6597213 B2 | 10/2019 |
| JP | 2019192950 A | 10/2019 |
| JP | 2021061686 A | 4/2021 |
| KR | 20160141979 A | 12/2016 |
| KR | 101911259 B1 | 10/2018 |
| KR | 20210016835 A | 2/2021 |
| KR | 20220145680 A | 10/2022 |

OTHER PUBLICATIONS

Written Opinion for related International Application No. PCT/KR2022/004730; action dated Oct. 27, 2022; (4 pages).
Office Action for related Korean Application No. 10-2021-0052563; action dated Aug. 21, 2023; (5 pages).
Notice of Allowance for related Korean Application No. 10-2021-0052563; action dated Feb. 21, 2024; (7 pages).
Office Action for related Japanese Application No. 2023-552371; action dated Jul. 2, 2024; (3 pages).
Extended European Search Report for related European Application No. 22791923.0; action dated Apr. 22, 2025; (8 pages).

* cited by examiner

POWER DEVICE PROTECTION APPARATUS

CROSS-REFERENCE TO RELATED APPLICATION

This application is the National Stage filing under 35 U.S.C. 371 of International Application No. PCT/KR2022/004730, filed on Apr. 1, 2022, which claims the benefit of earlier filing date of and rights of priority to Korean Application 10-2021-0052563, filed on Apr. 22, 2021, the contents of which are all hereby incorporated by reference herein in their entirety.

FIELD

The present disclosure relates to a power device protection apparatus, and more particularly, to a power device protection apparatus capable of detecting overcurrent of a power device.

BACKGROUND

A power device means a power semiconductor device and includes a semiconductor device for a power device.

A power device is characterized by high breakdown voltage, high current, and high frequency, compared to general semiconductor devices, and may be generally referred to as a power device.

A power device may include an inverter, a semiconductor-based circuit breaker, and a hybrid circuit breaker.

Referring to FIG. 1, a power device 101 may be implemented with a transistor such as insulated gate bipolar transistor (IGBT)/silicon carbide (SiC)/gallium nitride (GaN).

In the related art, in the connection of the power device 101, the magnitude of current passing through the power device is calculated by a voltage V_CE or V_DS across a collector (drain)/emitter (source).

If an overcurrent determination function using V_CE is provided in a power device driving IC 106, the overcurrent determination function of the power device is implemented based on a DESAT pin.

A reference numeral 102 denotes a high voltage blocking diode, which is turned off to protect circuits of components 103 to 106 when the power device 101 is connected to a high voltage.

Reference numerals 103 and 104 denote a resistor and a zener diode, which serve to adjust an overcurrent determination voltage.

Internal functions of the power device driving IC 106 may be implemented by external hardware (HW).

The related art power device driving IC 106 has a comparator therein, and the comparator compares a voltage input through the DESAT pin with an internal voltage reference to determine an overcurrent.

The voltage of the DESAT pin is the sum of a V_CE voltage of the power device 101, a forward voltage of an HV diode 102, a voltage across both ends of the resistor 103, and a voltage across both ends of the zener diode 104.

On the other hand, since the related art current setting is fixed in hardware, whether an overcurrent occurs has been determined by comparison with a fixed voltage reference value, but it is difficult to reflect the change in characteristics of the power device that changes depending on temperature.

In addition, since a value for recognizing an overcurrent must be changed when the characteristics of the power device are changed, it is difficult to continuously use the same hardware, and it is troublesome to change values and types of the resistor 103 and the zener diode 104 for each power device.

Even when using a power device module, a change is needed due to a very small V_CE input value for recognizing an overcurrent.

A DESAT input value of a general gate driving IC is fixed to around 9V, so it is difficult to detect an overcurrent of a module because the value is too high.

There is a method of adjusting an overcurrent detection level through an external resistor and a zener diode, but there are a variation in operation and a limit in that the operation is performed only with a fixed value in hardware.

An overcurrent recognition time may vary depending on the magnitude of current of an internal current source. However, since it is difficult to set the magnitude of the current source, there is a long time delay for recognizing the overcurrent.

The SiC or GaN withstands an overcurrent for a very short time, and thus needs a fast overcurrent detection, but the related art technology has a limitation because it has a fixed current source and a fixed voltage reference.

SUMMARY

The present disclosure is directed to solving the aforementioned problems and other drawbacks.

Another aspect of the present disclosure is to provide a power device protection apparatus capable of detecting an overcurrent of a power device in an optimized manner.

Another aspect of the present disclosure is to provide a power device protection apparatus capable of detecting an overcurrent of various power devices using a protection apparatus configured as the same hardware.

Another aspect of the present disclosure is to provide a power device protection apparatus capable of detecting an overcurrent in an optimized manner by reflecting temperature of a power device.

Another aspect of the present disclosure is to provide a power device protection apparatus capable of detecting an overcurrent in an optimized manner according to characteristics of a power device.

To achieve these and other advantages and in accordance with the purpose of the present disclosure, as embodied and broadly described herein, there is provided a power device protection apparatus according to an embodiment of the present disclosure that includes a comparator that is connected to a power device to determine whether an overcurrent occurs in the power device, and a control unit that controls the comparator to vary, in software, an overcurrent reference value for determining whether the overcurrent occurs, wherein the control unit receives temperature information of the power device, varies the overcurrent reference value based on the temperature information, and varies the overcurrent reference value according to the temperature information on the basis of a characteristic of the power device.

In an embodiment, the comparator determines a magnitude of a current output from the power device, determines whether the determined magnitude of the current exceeds a preset overcurrent reference value, and outputs a signal for turning off the power device when the determined magnitude of the current exceeds the overcurrent reference value.

In an embodiment, the control unit varies the overcurrent reference value according to a preset formula or at a predetermined ratio when the temperature information of the power device is received.

In an embodiment, the power device protection apparatus further includes a temperature sensor that is capable of sensing the temperature information of the power device.

In an embodiment, the control unit receives the temperature information from the power device.

In an embodiment, the control unit determines a characteristic curve of the power device based on a type of the power device, and varies the overcurrent reference value according to the temperature information on the basis of the characteristic curve.

In an embodiment, the control unit determines whether the characteristic of the power device is a positive temperature coefficient or a negative temperature coefficient, and varies the overcurrent reference value according to the temperature information on the basis of a result of the determination.

In an embodiment, when the characteristic of the power device is to operate with a positive temperature coefficient or a negative temperature coefficient according to a current flowing through the power device, the control unit varies the overcurrent reference value according to the temperature information based on the current flowing through the power device.

In an embodiment, when the power device has the negative temperature coefficient or the positive temperature coefficient based on a specific current, the control unit varies the overcurrent reference value according to the negative temperature coefficient or the positive temperature coefficient based on whether the current flowing through the power device exceeds the specific current.

In an embodiment, the power device protection apparatus further includes a diode that is connected to the comparator to block a current from flowing to the comparator when a preset voltage or more is applied to the power device.

In an embodiment, the power device protection apparatus further includes a bias current source that is connected between the comparator and the diode to turn on the diode when the power device is in an ON state, and a current source control module that controls the bias current source.

In an embodiment, the power device protection apparatus further includes a capacitor that is disposed between the diode and the comparator to suppress an overcurrent from being detected in the comparator when the power device is switched from an OFF state to an ON state.

In an embodiment, the power device protection apparatus further includes a transistor that is connected between the comparator and the capacitor to lower a voltage of a current detection line so that a current is not detected by the capacitor when the power device is in the OFF state.

In an embodiment, the power device protection apparatus further includes a digital-to-analog (DAC) converter that is connected between the comparator and the control unit to convert a control signal output from the control unit into an analog signal and input the converted analog signal to the comparator.

In an embodiment, the comparator is an analog comparator that receives the analog signal.

In an embodiment, the comparator is a digital comparator driven by software, and the power device protection apparatus further includes an analog-to-digital (ADC) converter that is connected between the power device and the comparator to convert an analog signal into a digital signal.

In an embodiment, the power device protection apparatus further includes a protection diode that is connected between the diode and a ground.

In an embodiment, the power device protection apparatus further includes an analog buffer that is disposed between the diode and the comparator.

Hereinafter, effects of a mobile terminal and a method of controlling the same according to the present disclosure will be described.

According to at least one of embodiments of the present disclosure, the present disclosure has an advantage that the same hardware can be used, even if a power device is changed, by varying, in software, an overcurrent reference value for determining whether an overcurrent occurs.

In addition, according to at least one of embodiments of the present disclosure, the present disclosure has an effect that a more precise overcurrent determination can be made not only by varying an overcurrent reference value according to temperature of a power device but also by varying the overcurrent reference value in consideration of a characteristic of the power device.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
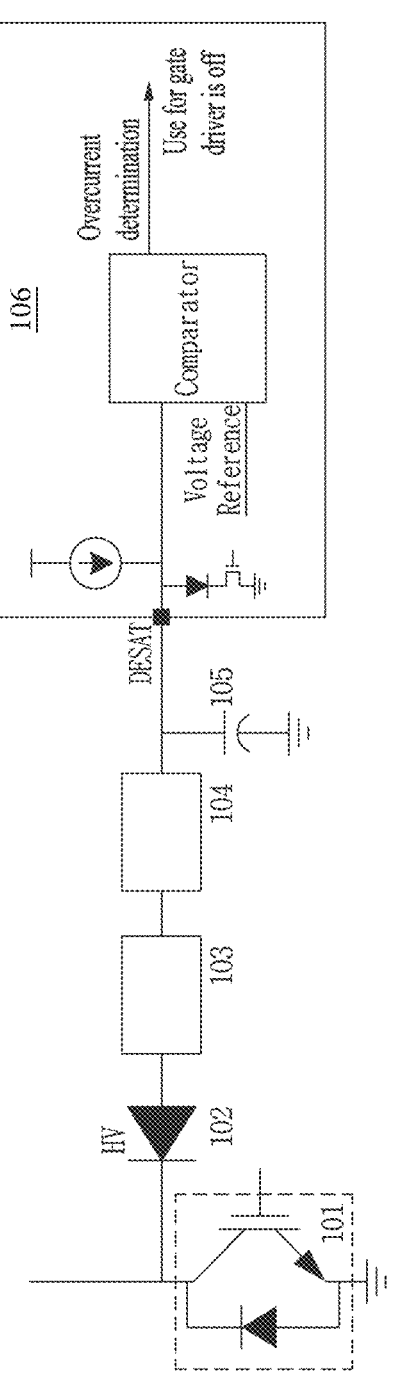
FIG. 1 is a conceptual view illustrating an apparatus for determining an overcurrent according to the related art.
Figure 2:
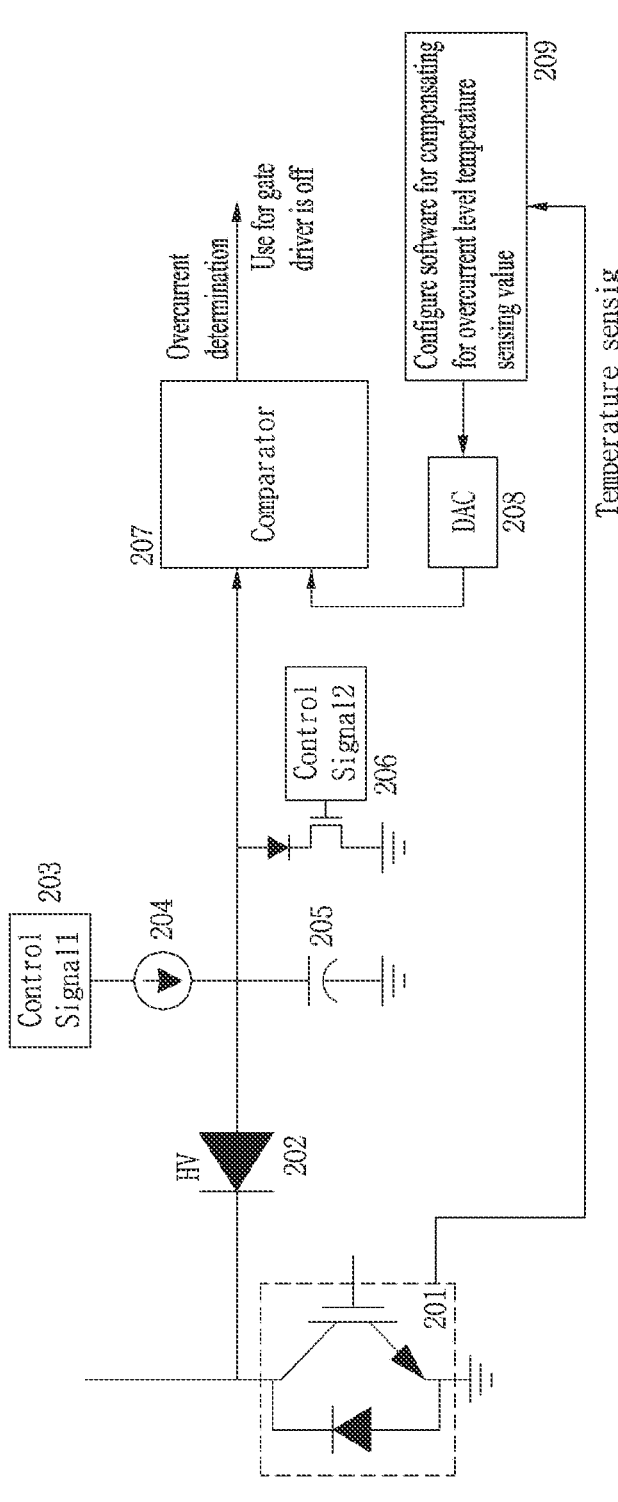
FIG. 2 is a circuitry view illustrating a power device protection apparatus in accordance with one embodiment of the present disclosure.
Figure 3:
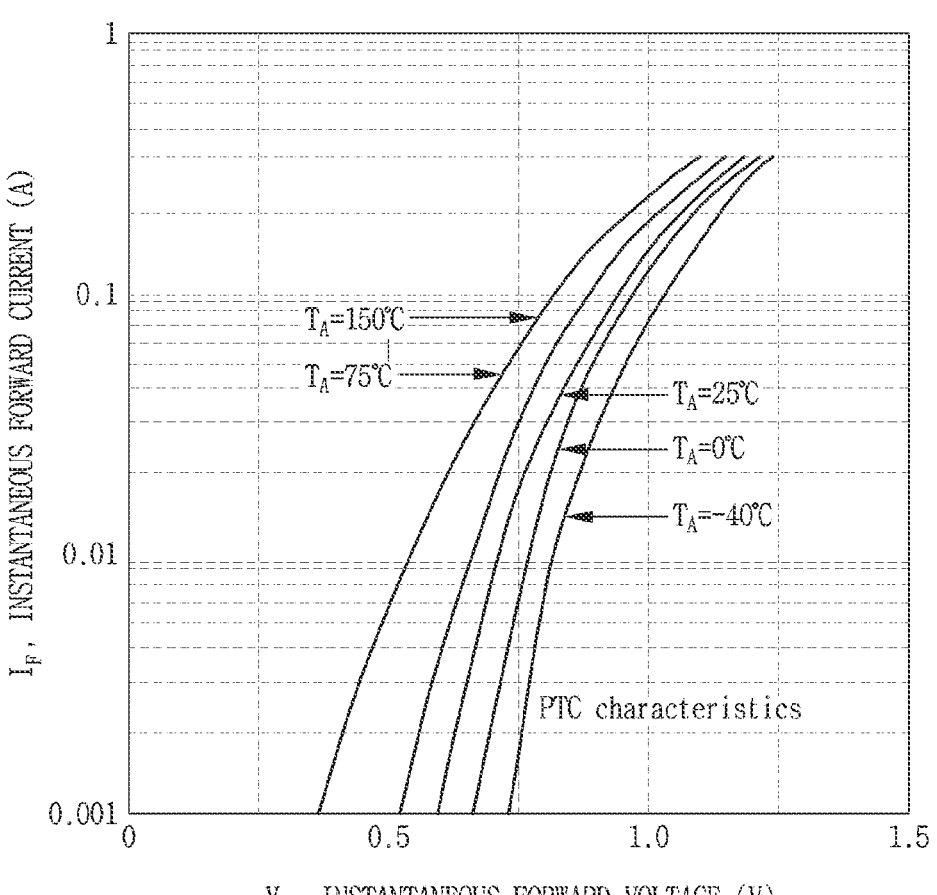
FIGS. 3 and 4 are conceptual views for explaining characteristics of a power device.
Figure 4:
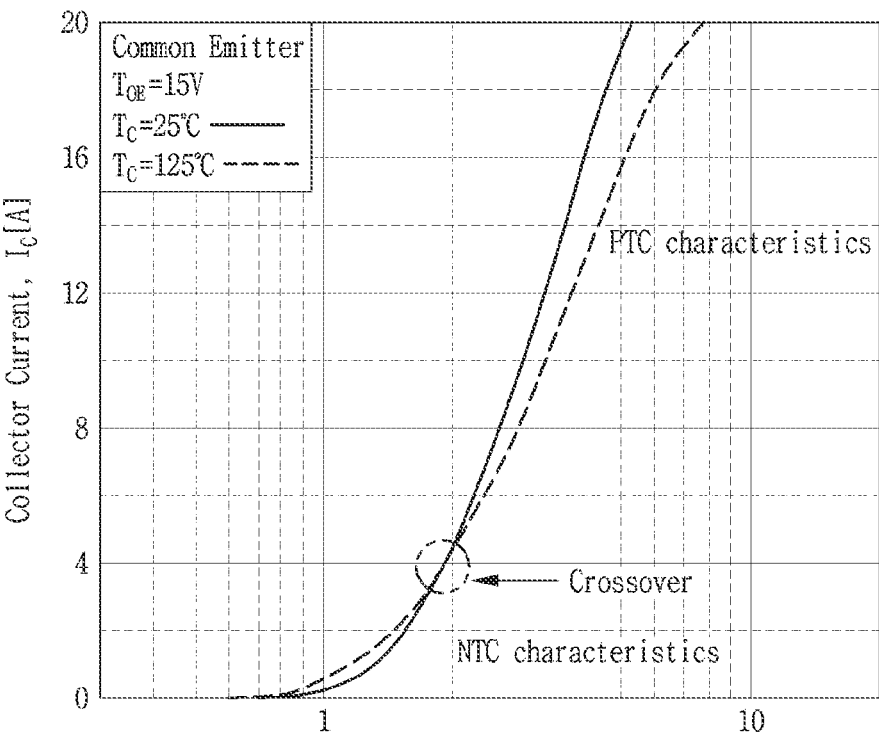

FIG. 2 is a circuitry view illustrating a power device protection apparatus in accordance with one embodiment of the present disclosure, and FIGS. 3 and 4 are conceptual views for explaining characteristics of a power device.

First, a power device protection apparatus according to one embodiment of the present disclosure includes a comparator 207 that is connected to a power device 201 to determine whether an overcurrent occurs in the power device, and a control unit 209 that controls the comparator 207 to vary, in software, an overcurrent reference value for determining whether the overcurrent occurs.

A reference numeral 201 illustrated in FIG. 2 may denote, for example, a switch of a power device, and may be referred to as a switch module or a semiconductor switch.

Referring to FIG. 2, a diode (e.g., high voltage blocking diode) 202 may be connected to the power device 201 to block a current from flowing to the comparator when a high voltage of preset pressure or higher is connected to the power device 201. The diode 202 may perform a function of protecting components 202 to 209 constituting the power device protection apparatus.

The power device protection apparatus may include a bias current source 204 that is connected between the comparator 207 and the diode 202 to generate a bias current for turning the diode 202 on to determine whether an overcurrent occurs when the power device 201 is in an ON state, and a current source control module 203 that controls the bias current source 204.

The current source control module 203 may generate a signal by the control unit 209 or separate software or set a magnitude of a current of the bias current source 204 based on a signal generated by an FPGA or the like.

The bias current source may be replaced with a bias resistor.

In addition, the power device protection apparatus may further include a capacitor 205 that is disposed between the diode 202 and the comparator 207 to block an overcurrent from being detected in the comparator when the power device is switched from an OFF state to an ON state. The capacitor 205 may be referred to as a blanking capacitor. In addition, the capacitor 205 serves to prevent noise.

In addition, the power device protection apparatus may further include a transistor 206 that is connected between the comparator 207 and the capacitor 205 to lower a voltage of a current detection line so that a current is not detected by the capacitor when the power device is in the OFF state.

When the power device is in the OFF state, the transistor 206 may lower a voltage of a current detection line to initialize the state of the current detection line, in order to suppress a current charged in the capacitor 205 from leaking (i.e., to turn the capacitor 205 off).

The transistor 206 may be controlled by a signal generated by the control unit 209 or separate software or a signal generated by an FPGA or the like.

In addition, the power device protection apparatus may further include a digital-to-analog converter (DAC) 208 that is connected between the comparator 207 and the control unit 209 to convert a control signal output from the control unit 209 into an analog signal and inputs the converted analog signal to the comparator 207.

In addition, the DAC 208 may convert data input from the control unit 209 or separate software into analog data.

The DAC 208 may convert the signal of the control unit 209 into analog data even during temperature compensation.

The comparator 207 may compare a value of the current detection line with an output value (overcurrent reference value) of the DAC 208 according to the setting of the control unit 209, and may determine that an overcurrent has occurred when the value of the current detection line is greater than the overcurrent reference value.

The comparator 207 may be an analog comparator that receives an analog signal.

On the other hand, the present disclosure is not limited thereto, and the comparator 207 may be a digital comparator driven by software 510. In this case, the power device protection apparatus may further include an analog-to-digital converter 210 that is connected between the power device 201 and the comparator 207 to convert an analog signal into a digital signal (see FIG. 5 and FIG. 7). In this case, the DAC 208 described in FIG. 2 may be omitted.

Referring back to FIG. 2, the comparator 207 may determine a magnitude of a current output from the power device 201 and determine whether the determined magnitude of the current exceeds a preset overcurrent reference value.

The comparator 207 may determine that the power device is in an overcurrent state when the determined magnitude of the current exceeds the overcurrent reference value.

The comparator 207 may output a signal for turning off the power device when the determined magnitude of the current exceeds the overcurrent reference value. In this case, the power device 201 may be turned off.

At this time, the control unit 209 may vary (or change)/set the overcurrent reference value for determining whether the overcurrent occurs, based on temperature of the power device.

For example, the control unit 209 may receive temperature information of the power device.

The control unit 209 may vary the overcurrent reference value based on the temperature information.

In addition, the control unit 209 may additionally consider (reflect) characteristics of the power device when varying the overcurrent reference value according to the temperature of the power device.

Specifically, the control unit 209 may vary the overcurrent reference value according to the temperature information based on the characteristics of the power device. That is, the control unit 209 may vary the overcurrent reference value in consideration of both the temperature and the characteristics of the power device, rather than merely changing the overcurrent reference value based on the temperature of the power device.

When the temperature information of the power device is received, the control unit 209 may vary the overcurrent reference value in a predetermined formula or at a constant ratio.

At this time, the power device protection apparatus may further include a temperature sensor (not shown) capable of sensing temperature information of the power device. The control unit 209 may receive temperature information of the power device protection apparatus from the temperature sensor.

The temperature sensor may alternatively be disposed in the power device or may be disposed in a space independent of the power device, to sense the temperature of the power device.

On the other hand, the power device 201 may be configured to be capable of sensing temperature information on its own (for example, having its own temperature measurement function). In this case, the control unit 209 may also receive the temperature information of the power device from the power device.

The control unit 209 may set the overcurrent reference value by software. To this end, the control unit 209 may transmit an overcurrent reference value set by software to the DAC 208.

For example, the control unit 209 may set the overcurrent reference value through a serial/parallel interface or serial communication (SPI/I2C/UART).

Also, the control unit 209 may receive the temperature information of the power device 201 and set a temperature compensation value by software. For example, the control unit 209 may receive the temperature information of the power device 201 through PTC/NTC of the power device 201 or through a separate temperature sensor.

In this case, when the temperature information is an analog input, the control unit 209 may receive a digital input value through the analog-to-digital converter 210.

Meanwhile, the control unit 209 may determine a characteristic curve of a power device based on a type of the power device, and may vary an overcurrent reference value according to temperature information, based on the characteristic curve.

For example, the control unit 209 may determine whether the characteristic of the power device is a positive temperature coefficient or a negative temperature coefficient, and may vary the overcurrent reference value according to the temperature information based on a result of the determination.

When the power device has a characteristic of operating with a positive temperature coefficient or a negative temperature coefficient according to a current (or current value) flowing through the power device, the control unit 209 may vary the overcurrent reference value according to the temperature information based on the current (or current value) flowing through the power device.

Specifically, when the power device has a negative temperature coefficient or a positive temperature coefficient based on a specific current, the control unit 209 may vary the overcurrent reference value according to the negative temperature coefficient or the positive temperature coefficient based on whether the current flowing through the power device exceeds the specific current.

Referring to FIGS. 3 and 4, the power device according to the present disclosure may include at least one of SiC and IGBT.

SiC is a power device having a positive temperature coefficient (PTC), and IGBT is a power device having both a positive temperature coefficient and a negative temperature coefficient (NTC).

In the case of the IGBT, a predetermined part thereof operates with the negative temperature coefficient and the rest operates with the positive temperature coefficient according to a current.

For example, as illustrated in FIG. 4, when a current flowing through the IGBT is lower than a specific current (e.g., 4A), the IGBT may operate with a negative temperature coefficient. On the other hand, when the current flowing through the IGBT is higher than the specific current, the IGBT may operate with a positive temperature coefficient.

Operating with a positive temperature coefficient means that a voltage across both ends (or resistance across both ends) when using SiC as a power switch increases as temperature rises while decreasing as the temperature is lowered.

Operating with a negative temperature coefficient means that a voltage across both ends (or resistance across both ends) decreases as temperature rises.

Since the power device protection apparatus according to the present disclosure has a different characteristic depending on a power device used, the control unit 209 of the power device protection apparatus may divide (distinguish) a part operating with a negative temperature coefficient (NTC) and a part operating with a positive temperature coefficient (PTC) according to temperature, and may vary an overcurrent reference value for determining an overcurrent according to temperature information on the basis of the characteristic curves as illustrated in FIGS. 3 and 4.

Accordingly, in the present disclosure, a more detailed and accurate overcurrent detection is achieved, and overcurrent setting is allowed in current bands of various areas, not limited to a PTC area and an NTC area.

In summary, in the power device protection apparatus according to the present disclosure, the overcurrent reference value can be changed as desired by a user.

In addition, according to the present disclosure, the overcurrent reference value can be compensated for according to the temperature using software in a predetermined formula or at a constant ratio, and can also be set/varied more precisely for each power device by additionally considering the characteristic curve of the power device.

Through this, the module according to the present disclosure can precisely set the overcurrent reference value even when a VCE value for recognizing the overcurrent is very small (a module having a large current uses low RDSon, and thereby VCE (or VDS) is low).

Therefore, according to the present disclosure, even if the same hardware configuration is used from discrete semiconductors to modules (or integrated circuits (ICs)), the overcurrent reference value can be changed and applied through software, resulting in significantly enhancing versatility.

Here, the discrete semiconductor may refer to a small electronic semiconductor component that performs a single function within a product, such as a transistor, diode, resistor, or capacitor.

The integrated circuit (IC) may refer to that discrete semiconductors are integrated in one place to implement complex functions.

In addition, in the case of the present disclosure, since the magnitude of the current of the current source can be adjusted, the overcurrent recognition can be performed more quickly, and a size reduction can be achieved by integrated circuits.

Hereinafter, a power device protection apparatus according to another embodiment of the present disclosure will be described in more detail with reference to the accompanying drawings.

FIGS. 5, 6, 7, 8 and 9 are conceptual views for explaining a power device protection apparatus according to another embodiment of the present disclosure.

As described above, the power device protection apparatus according to the present disclosure may include the DAC 207 that converts data input from the control unit 209 (or separate software) into analog data (or analog signal).

In this case, the comparator 207 may be an analog comparator 207 using an analog signal.

Meanwhile, the power device protection apparatus of the present disclosure is not limited thereto.

Figure 5:
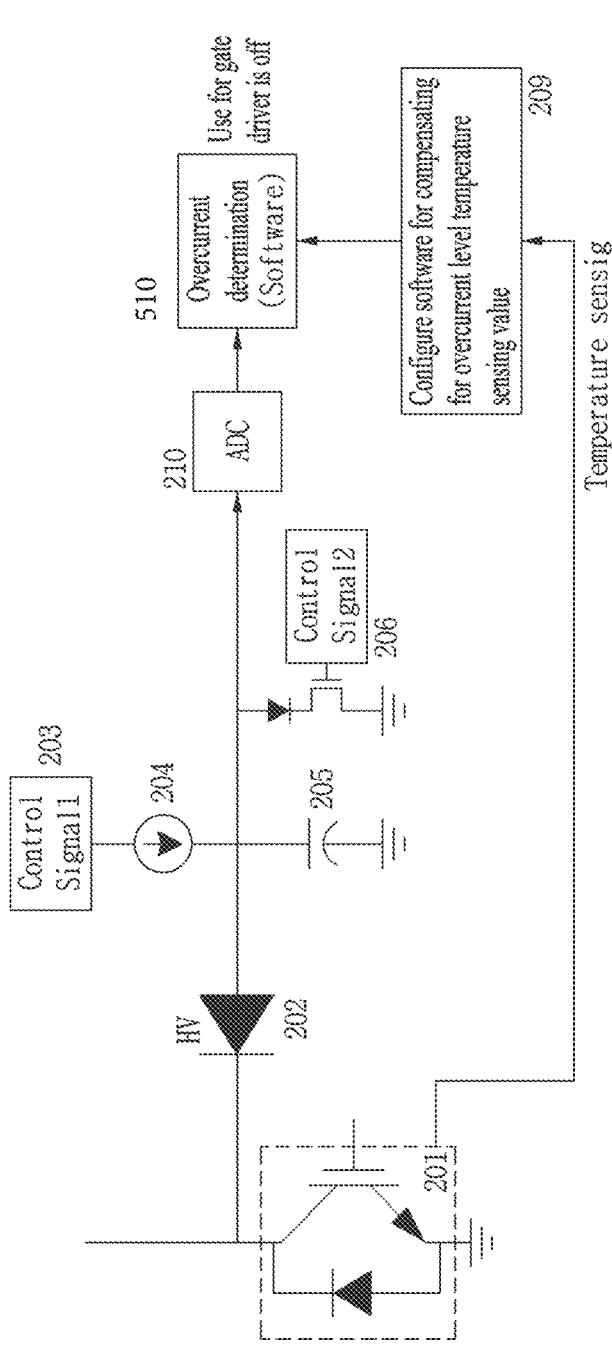
FIGS. 5, 6, 7, 8 and 9 are conceptual views for explaining a power device protection apparatus according to another embodiment of the present disclosure.

For example, as illustrated in FIG. 5, the power device protection apparatus according to the present disclosure may include an analog-to-digital converter (ADC) 210 that converts an analog signal into a digital signal, instead of using the comparator 207 and the DAC 208.

In this case, the ADC 210 may be disposed between the diode 202 and a module equipped with software 510 for determining whether an overcurrent occurs.

For example, the module may use a digital signal, and may determine whether an overcurrent occurs by using the digital signal converted in the ADC 210.

The operation/function/control method of the module may be the same as/similar to those of the comparator 207 described above.

Figure 6:
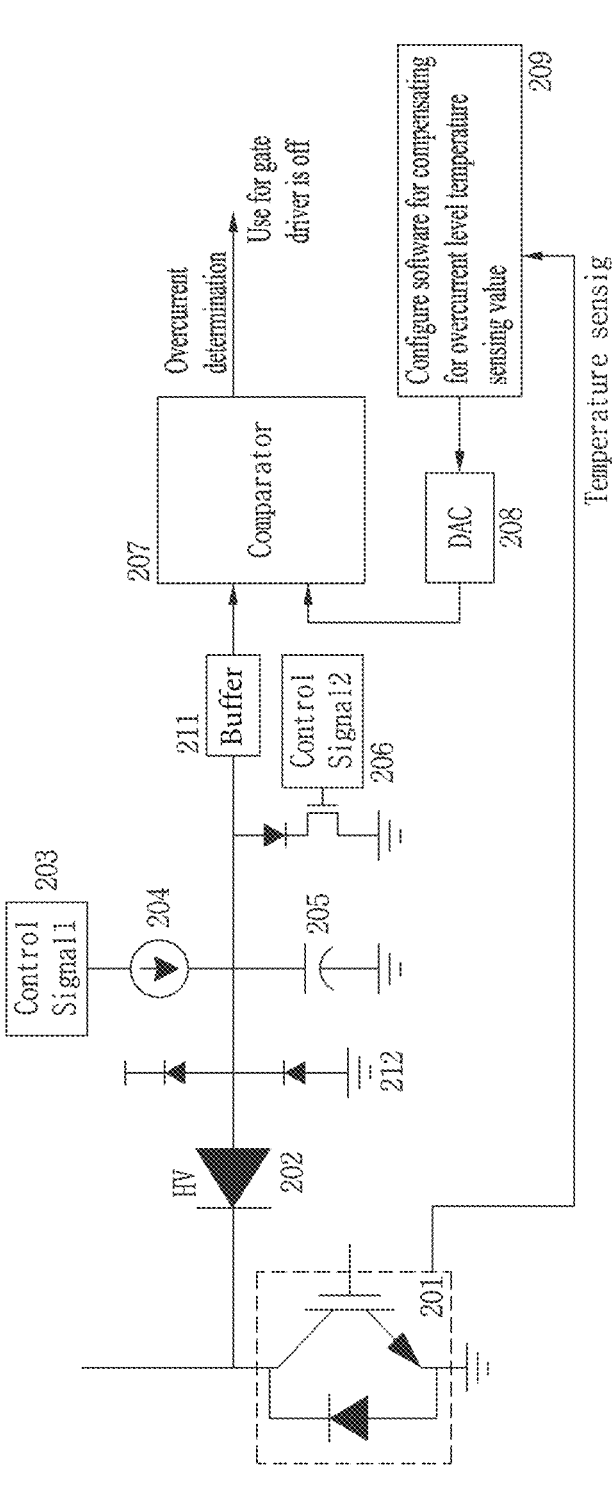

In addition, as illustrated in FIG. 6, the power device protection apparatus according to the present disclosure may further include a protection diode 212 that is disposed next to the diode 202 toward a VCC line and a ground (GND) for reliable protection of the current detection line.

As illustrated in FIG. 6, the protection diode 212 may be connected between the diode 212 and the ground.

In addition, the power device protection apparatus may further include an analog buffer 211 disposed between the diode 202 and the comparator 207.

Figure 7:
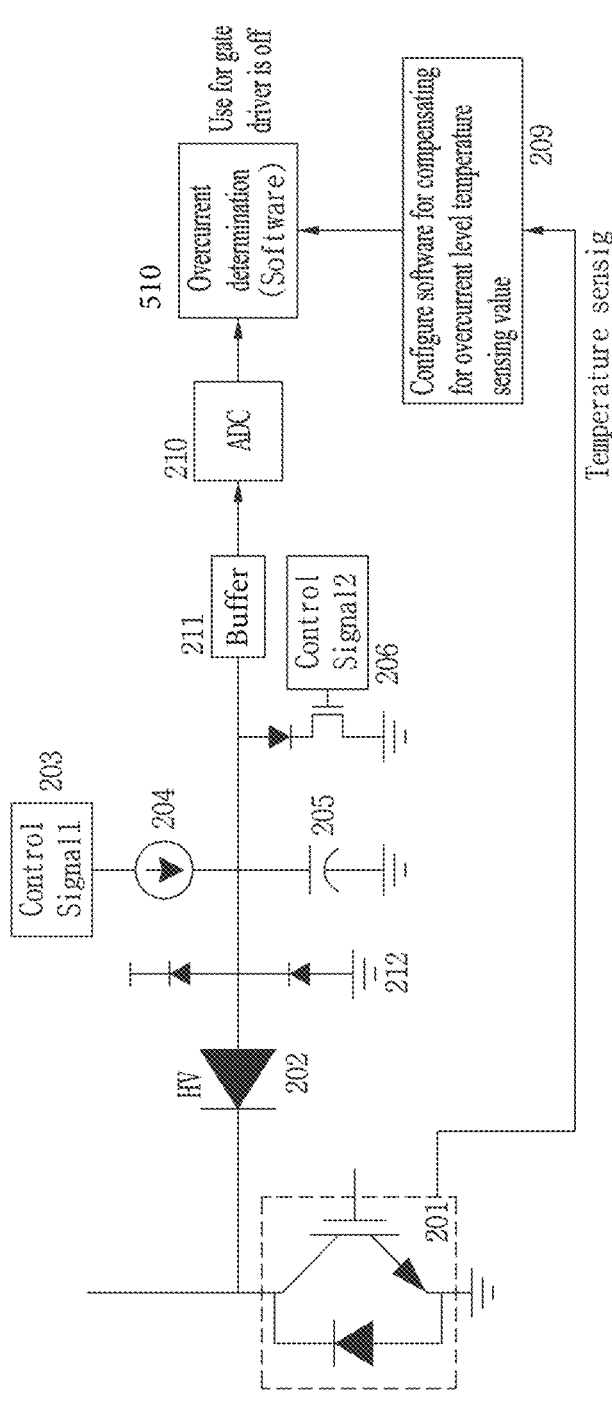

FIG. 7 illustrates an embodiment including the analog-to-digital converter 210 and an overcurrent determination software 510 module, instead of the digital-to-analog converter (DAC) 208 and the comparator 207, while having the protection diode 212 and the analog buffer 211 described above.

In this case, the analog buffer 211 may be disposed between the diode 202 and the analog-to-digital converter 210.

Figure 8:
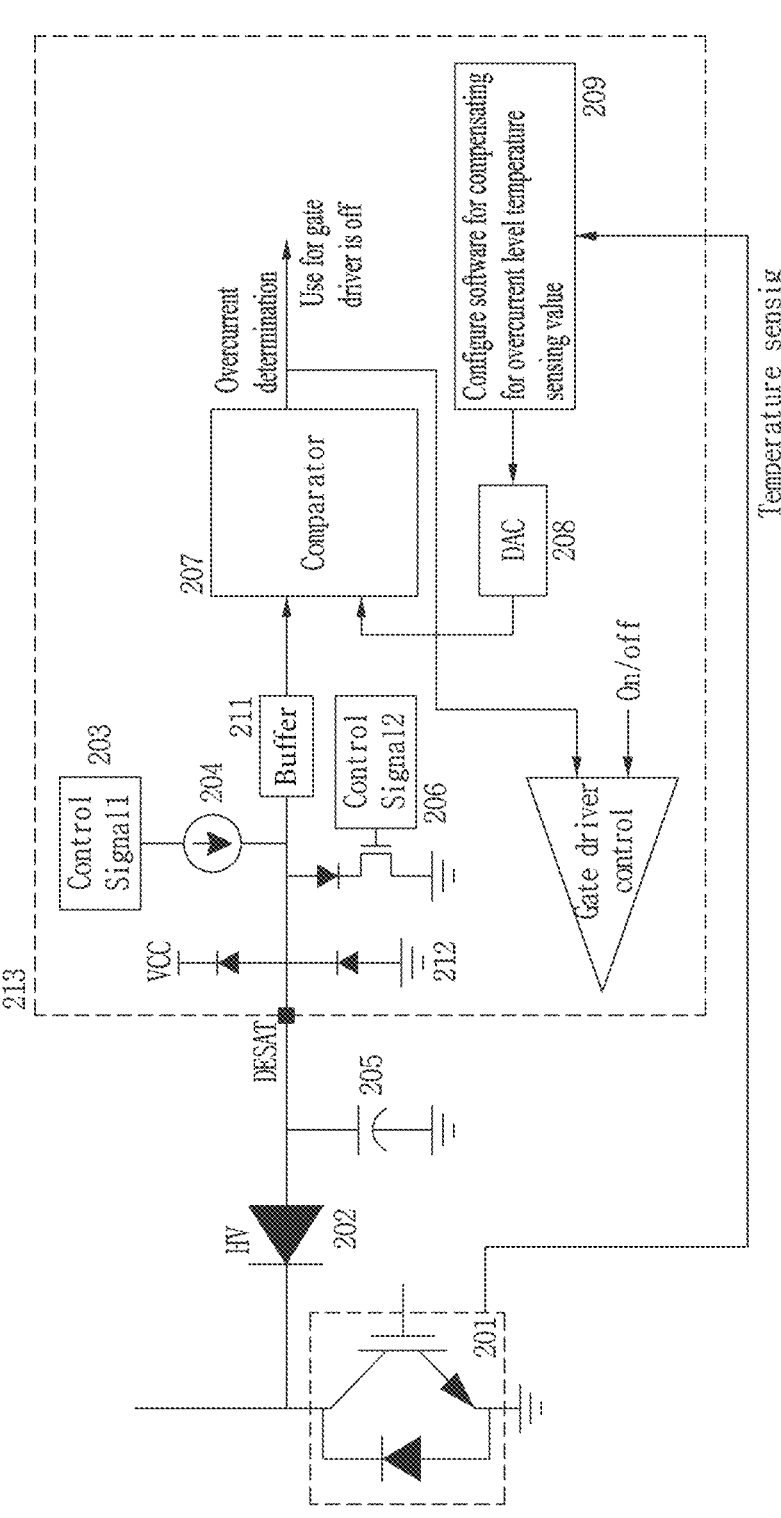
Figure 9:
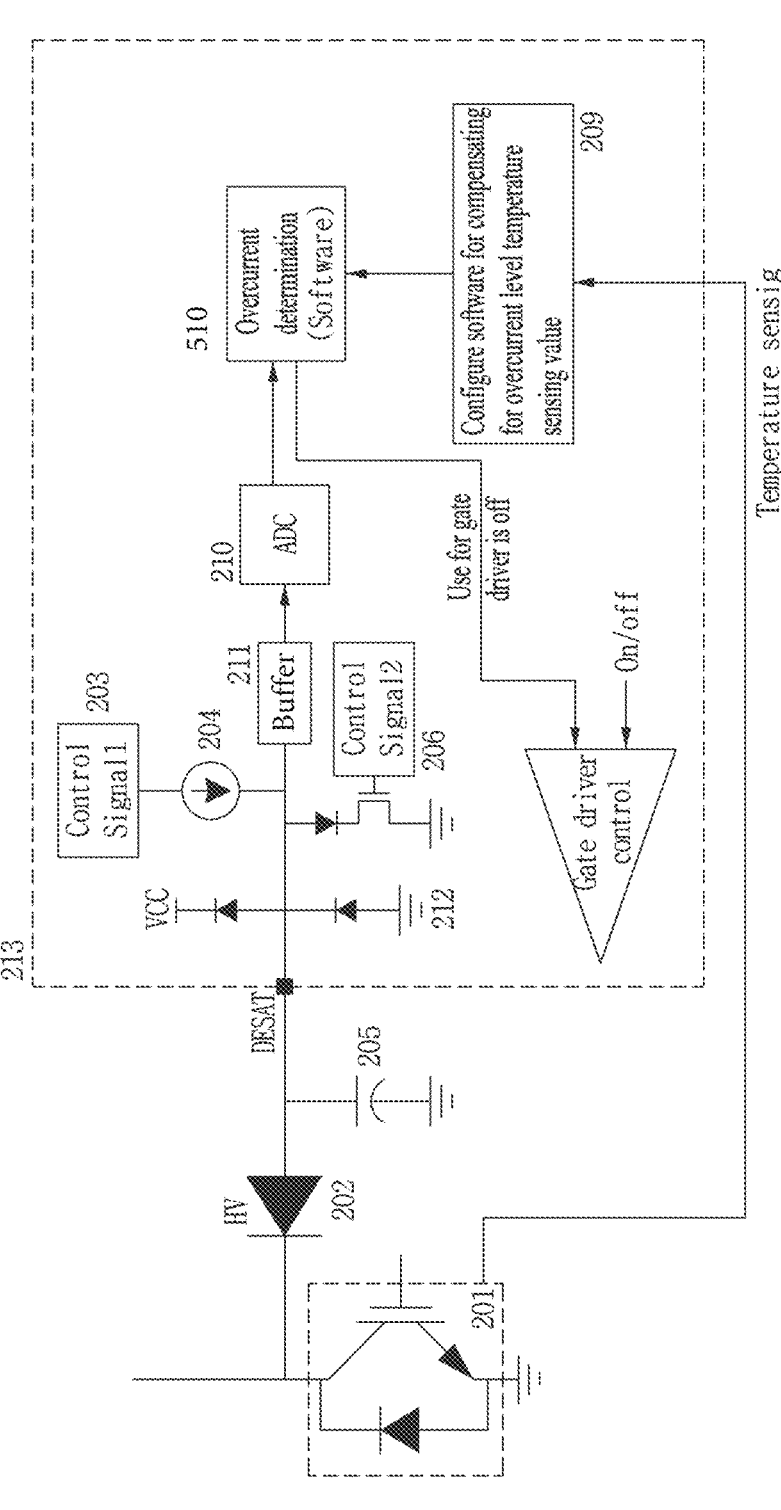

Meanwhile, as illustrated in FIGS. 8 and 9, the power device protection apparatus according to the present disclosure may be implemented to constitute an integrated circuit 213 together with a gate driver.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may also include the control unit 209 of the power device protection apparatus. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A power device protection apparatus comprising:
   a comparator that is connected to a power device to determine whether an overcurrent occurs in the power device; and
   a control unit that controls the comparator to vary, in software, an overcurrent reference value for determining whether the overcurrent occurs,
   wherein the control unit receives temperature information of the power device,
   varies the overcurrent reference value based on the temperature information, and
   varies the overcurrent reference value according to the temperature information based on a characteristic of the power device,
   wherein:
      the control unit determines whether the characteristic of the power device is a positive temperature coefficient or a negative temperature coefficient, and
      varies the overcurrent reference value according to the temperature information based on a result of the determination.

2. The apparatus of claim 1, wherein the comparator determines a magnitude of a current output from the power device,
   determines whether the determined magnitude of the current exceeds a preset overcurrent reference value, and
   outputs a signal for turning off the power device when the determined magnitude of the current exceeds the overcurrent reference value.

3. The apparatus of claim 1, wherein the control unit varies the overcurrent reference value according to a preset formula or at a predetermined ratio when the temperature information of the power device is received.

4. The apparatus of claim 1, further comprising a temperature sensor that is capable of sensing the temperature information of the power device.

5. The apparatus of claim 1, wherein the control unit receives the temperature information from the power device.

6. The apparatus of claim 1, wherein the control unit determines a characteristic curve of the power device based on a type of the power device, and
   varies the overcurrent reference value according to the temperature information based on the characteristic curve.

7. The apparatus of claim 1, wherein the control unit, when the characteristic of the power device is to operate with a positive temperature coefficient or a negative temperature coefficient according to a current flowing through the power device, varies the overcurrent reference value according to the temperature information based on the current flowing through the power device.

8. The apparatus of claim 7, wherein the control unit, when the power device has the negative temperature coefficient or the positive temperature coefficient based on a specific current, varies the overcurrent reference value according to the negative temperature coefficient or the positive temperature coefficient based on whether the current flowing through the power device exceeds the specific current.

9. The apparatus of claim 1, further comprising a diode that is connected to the comparator to block a current from flowing to the comparator when a preset voltage or more is applied to the power device.

10. The apparatus of claim 9, further comprising:

a bias current source that is connected between the comparator and the diode to turn on the diode when the power device is in an ON state; and a current source control module that controls the bias current source.

11. The apparatus of claim 9, further comprising a capacitor that is disposed between the diode and the comparator to suppress an overcurrent from being detected in the comparator when the power device is switched from an OFF state to an ON state.

12. The apparatus of claim 11, further comprising a transistor that is connected between the comparator and the capacitor to lower a voltage of a current detection line so that a current is not detected by the capacitor when the power device is in the OFF state.

13. The apparatus of claim 1, further comprising a digital-to-analog (DAC) converter that is connected between the comparator and the control unit to convert a control signal output from the control unit into an analog signal and input the converted analog signal to the comparator.

14. The apparatus of claim 13, wherein the comparator is an analog comparator that receives the analog signal.

15. The apparatus of claim 1, wherein the comparator is a digital comparator driven by software, and the apparatus further comprises an analog-to-digital (ADC) converter that is connected between the power device and the comparator to convert an analog signal into a digital signal.

16. The apparatus of claim 9, further comprising a protection diode that is connected between the diode and a ground.

17. The apparatus of claim 9, further comprising an analog buffer that is disposed between the diode and the comparator.

18. A power device protection apparatus comprising:

a comparator that is connected to a power device to determine whether an overcurrent occurs in the power device; and a control unit that controls the comparator to vary, in software, an overcurrent reference value for determining whether the overcurrent occurs, wherein the control unit receives temperature information of the power device, varies the overcurrent reference value based on the temperature information, and varies the overcurrent reference value according to the temperature information based on a characteristic of the power device, wherein:

the control unit, when the characteristic of the power device is to operate with a positive temperature coefficient or a negative temperature coefficient according to a current flowing through the power device, varies the overcurrent reference value according to the temperature information based on the current flowing through the power device; and the control unit, when the power device has the negative temperature coefficient or the positive temperature coefficient based on a specific current, varies the overcurrent reference value according to the negative temperature coefficient or the positive temperature coefficient based on whether the current flowing through the power device exceeds the specific current.

* * * * *